(12) United States Patent
Eriksen et al.

(10) Patent No.: US 9,531,245 B2
(45) Date of Patent: Dec. 27, 2016

(54) DIRECT DRIVE WIND TURBINE WITH A THERMAL CONTROL SYSTEM

(75) Inventors: Uffe Eriksen, Horsens (DK); Steffen Soerensen, Hinnerup (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 571 days.

(21) Appl. No.: 13/456,268

(22) Filed: Apr. 26, 2012

(65) Prior Publication Data

US 2012/0282096 A1    Nov. 8, 2012

(30) Foreign Application Priority Data

May 3, 2011    (EP) .................................... 11164589

(51) Int. Cl.
| | |
|---|---|
| *H02K 15/12* | (2006.01) |
| *H02K 7/18* | (2006.01) |
| *H02K 5/173* | (2006.01) |
| *F03D 80/70* | (2016.01) |
| *H02K 9/19* | (2006.01) |
| *H02K 7/08* | (2006.01) |
| *F16C 37/00* | (2006.01) |

(52) U.S. Cl.
CPC ............. *H02K 15/125* (2013.01); *F03D 80/70* (2016.05); *F16C 37/007* (2013.01); *H02K 5/1737* (2013.01); *H02K 7/1838* (2013.01); *F05B 2220/7066* (2013.01); *F05B 2260/20* (2013.01); *H02K 7/086* (2013.01); *H02K 9/19* (2013.01); *H02K 2201/03* (2013.01); *H02K 2213/09* (2013.01); *Y02E 10/722* (2013.01); *Y02E 10/725* (2013.01)

(58) Field of Classification Search
CPC .. Y02E 10/70; F05B 2240/21; F05B 2240/24; F05B 2240/10; F05B 2240/20; F05B 2240/96; F05B 2240/50; F05B 2240/60; F03D 7/00; B60K 16/00; B60L 8/006; H02J 3/386; H02P 2009/004; G05B 2219/2619
USPC ........ 384/476; 290/44, 55; 415/2.1, 4.1, 4.2, 415/4.5, 4.4, 905, 906
See application file for complete search history.

(56) References Cited

U.S. PATENT DOCUMENTS 2,747,945 A * 5/1956 Fulton ................. F16C 33/3862
                                                            384/467
4,948,269 A * 8/1990 Hamilton ............. B26D 7/2628
                                                            384/467
(Continued)

FOREIGN PATENT DOCUMENTS

| CN | 101523066 A | 9/2009 |
|---|---|---|
| CN | 101711311 A | 5/2010 |

(Continued)

*Primary Examiner* — Tulsidas C Patel
*Assistant Examiner* — Charles Reid, Jr.

(57) ABSTRACT

A direct drive wind turbine with a thermal control system has a generator with a rotor and a stator and a bearing with an inner ring and an outer ring connecting the rotor and the stator rotatively. The thermal control system includes a cooling system and a heating system. The cooling system includes at least one heat sink which is in thermal communication with the inner ring of the bearing and a heat dissipater which is in thermal communication with the heat sink. The heating system includes at least one heating element being in thermal communication with the outer ring of the bearing.

14 Claims, 4 Drawing Sheets

(56) References Cited

U.S. PATENT DOCUMENTS

| | | | | |
|---|---|---|---|---|
| 5,183,342 | A * | 2/1993 | Daiber et al. | 384/475 |
| 6,676,122 | B1 * | 1/2004 | Wobben | F03D 9/002 |
| | | | | 290/44 |
| 7,161,259 | B2 * | 1/2007 | Lagerwey | 290/44 |
| 2008/0298733 | A1 * | 12/2008 | Glueck | F16C 33/58 |
| | | | | 384/476 |
| 2009/0302611 | A1 * | 12/2009 | Masters et al. | 290/53 |
| 2010/0052325 | A1 * | 3/2010 | Perner et al. | 290/52 |
| 2010/0056315 | A1 * | 3/2010 | Scholte-Wassink | F03D 1/003 |
| | | | | 475/159 |
| 2010/0135793 | A1 | 6/2010 | Krauss | |
| 2011/0001282 | A1 * | 1/2011 | Taniguchi et al. | 269/55 |
| 2011/0187120 | A1 * | 8/2011 | Bevington et al. | 290/55 |

FOREIGN PATENT DOCUMENTS

| | | | | |
|---|---|---|---|---|
| DE | 3826945 | A1 | 2/1990 | |
| DE | WO 2004104434 | A1 * | 12/2004 | F16C 37/007 |
| DE | 102007029571 | A1 * | 11/2008 | F16C 25/08 |
| EP | 0574103 | A1 | 12/1993 | |
| EP | 1710432 | A1 | 10/2006 | |
| EP | 2163761 | A1 | 3/2010 | |
| GB | 2224085 | A | 4/1990 | |
| JP | H0425343 | A | 1/1992 | |
| JP | 2008157340 | A | 7/2008 | |
| JP | 2011047359 | A | 3/2011 | |
| WO | WO 2007051464 | A1 | 5/2007 | |
| WO | WO 2008041919 | A1 | 4/2008 | |
| WO | WO 2008131766 | A2 | 11/2008 | |
| WO | WO 2011004472 | A1 | 1/2011 | |
| WO | WO 2011031165 | A1 * | 3/2011 | |

* cited by examiner

DIRECT DRIVE WIND TURBINE WITH A THERMAL CONTROL SYSTEM

CROSS REFERENCE TO RELATED APPLICATIONS

This application claims priority of European Patent Office application No. 11164589.1 EP filed May 3, 2011. All of the applications are incorporated by reference herein in their entirety.

FIELD OF INVENTION

The thermal control of a bearing of a wind turbine is described. In particular, a direct drive wind turbine with a thermal control system, a bearing assembly and a method for controlling the temperature of a bearing are described.

SUMMARY OF INVENTION

The bearing of a wind turbine has a clearance of approximately −0.1 to 0.2 mm. In order to control the lifetime and air-gap of the generator the clearance should be controlled. The problem is that the inner ring of the bearing heats up and expands which leads to reduced lifetime of the bearing. The reason for the heat up is that the inner ring of the bearing together with the shaft structure has a small mass/stiffness compared to the mass/structure of the outer ring.

For outer rotor/inner stator generators the heat difference is even higher because of the large mass of the blade hub and the rotor yoke connected to the outer ring. Additionally, are the hub and yoke structure cooled by ambient air.

This means that the average temperature of the inner ring is higher than the average temperature of the outer ring and structure around the outer ring.

The bearing of a wind turbine is normally not cooled. However, it is generally known to cool a bearing by an integrated oil lubrication system where the oil is cooled and pumped around in the bearing assembly. The exchange of oil is limited and not sufficient in order to cool down a large main bearing for a direct drive wind turbine. Furthermore, oil lubrication systems for integrated cooling are complex and there is always the risk of oil leakage in the wind turbine which should be avoided.

For grease lubricated bearings no cooling systems are known.

An improved cooling for a bearing is provided by the independent claims. The dependent claims offer further embodiments.

One aspect is directed to a direct drive wind turbine with a thermal control system. The wind turbine has a generator with a rotor and a stator, a bearing with an inner ring and an outer ring connecting the rotor and the stator rotatively. The thermal control system comprises a cooling system and a heating system. The cooling system comprises at least one heat sink which is in thermal communication with the inner ring of the bearing and a heat dissipater which is in thermal communication with the heat sink. The heating system comprises at least one heating element being in thermal communication with the outer ring of the bearing.

It is also possible to provide the cooling system to the outer ring and/or the heating system to the inner ring as well. This expands the possibilities of controlling the temperature of the bearing.

Cooling the inner ring and heating the outer ring facilitates control and a reduction or elimination of the temperature difference between the inner and the outer ring of the bearing during operation of the wind turbine. Uncontrolled and unwanted thermal expansion of the inner ring and uncontrolled and unwanted thermal compression of the outer ring is thus avoided. Reliability and lifetime of the bearing is increased.

Further, it is now possible to control the bearing clearance (−0.1 to 0.2 mm) in order to control and maintain the lifetime and the air-gap of the generator.

The cooling system may be used for grease and oil lubricated bearings as well.

The heat sink of the direct drive wind turbine may comprise a cooling reservoir for a cooling medium like water. This way, a water cooling system which is already installed in the nacelle may be used to provide a sufficient cooling of the inner ring of the bearing. This solution may be easily installed in existing wind turbines having no cooling for the bearing.

The heat sink may be arranged at an inner circumferential surface of the inner ring. The inner circumferential surface offers a good contact region for the heat sink because of the good size and surface characteristics.

The heat sink may be formed integrally with the inner ring. At least part of the heat sink may be located inside the inner ring which may improve the heat transfer from the inner ring to the heat sink The heat sink may both comprise integrally formed parts and parts arranged at the surface of the inner ring.

The cooling system may be an easy to install add on solution for a standard bearing or it may be an integrated part of the inner or outer ring in such a way that cooling channels or chambers for example are integrated in the inner and/or outer ring of the bearing.

The heat sink may be connected with the heat dissipater via a conduct. The heat sink preferably a cooling reservoir may be connected to a water cooling system of the wind turbine that is already installed in the nacelle for cooling the generator etc. The heat dissipater of the water cooling system may be used for cooling the bearing as well.

The conduct may be equipped with a valve to control the flow of the cooling medium into and from the cooling reservoir to control the cooling of the bearing.

On the other hand, a heat sink may be used which cools the inner ring locally like cooling fins or peltier elements, for example.

The heating element may comprise electrical heating means and/or hot fluid heating means. One or more heating means like for example electrical wire heating elements or hot fluids in tubes, hoses and/or channels originating for example from a hydraulic fluid system like a hydraulic pitch system may be utilized. A water heating system with a water heater like an electrical boiler with a controllable inlet/outlet valve may also be used.

The heating element may be arranged at the outer ring, a rotor yoke and/or a blade hub. The heating element needs to be in thermal communication with the outer ring. Accordingly, it may be attached to parts in thermal communication with the outer ring like the rotor yoke or the blade hub. The heating element may be arranged at a single place at one of the mentioned structures or at various places at one or more of the structures.

The heating element may also be formed integrally with the outer ring.

Thermal interface material may be arranged between the bearing and the heat sink and/or the heating element. To provide a low thermal resistance, a sheet of aluminium, temperature conductive paste or other suitable thermal interface material may be applied between the surface of the ring and the surface of the heat sink or the heating element.

The thermal control system may comprise a control device in communication with the cooling system and/or the heating system for controlling the temperature of the bearing. The control device may be used to control the cooling of the inner ring by for example controlling a valve located in a conduct between the heat sink and the heat dissipater and/or to control the heating of the outer ring.

The thermal control system may comprise at least one temperature measurement device. The temperature measurement device may be installed at the inner and/or outer ring, even at multiple measurement points to allow for an accurate and reliable temperature survey of the inner ring and the bearing.

The generator may be an outer rotor/inner stator generator. The inner ring of the bearing may be connected to a stationary part of the wind turbine and the outer ring of the bearing may be connected to a rotor yoke of the wind turbine.

The cooling system may comprise a number of cooling reservoirs with substantially the same outer radius as the inner radius of the inner ring of the bearing. The length of the reservoirs may cover only part of the perimeter so that more than one reservoir is arranged to cool the inner ring, which makes the installation of the cooling system on existing installations easier.

Another aspect is directed to a bearing assembly comprising an inner ring and an outer ring, wherein at least one cooling reservoir is arranged at the inner and/or the outer ring and wherein the cooling reservoir comprises at least one port for exchange of a cooling medium. At least one heating element is arranged at the outer ring and/or the inner ring. Providing a cooling reservoir and a heating element directly at the bearing allows for a quick and thorough temperature adjustment. Reliability and lifetime of the bearing is thereby increased.

A number of cooling reservoirs may be evenly distributed along an inner circumference of the inner ring. This arrangement facilitates the installation into an already existing wind turbine. Further, it may adjust for local temperature variations.

The cooling reservoirs may extend along an inner circumferential surface of the inner ring and two cooling reservoirs may be arranged in parallel. This arrangement makes an even finer temperature correction possible. Hot spots for example may be eliminated.

At least one temperature measurement device may be arranged at the inner and/or the outer ring in order to measure the temperature of the ring or the bearing. The measurement values may be provided to a control device to allow for a good temperature regulation of the bearing.

A further aspect is directed to a method for controlling the temperature of a bearing. The temperature of the bearing is measured and the flow of a cooling medium like water through at least one cooling reservoir attached to a ring of the bearing is controlled. A heating element in thermal communication with a ring of the bearing is also controlled. Employing this method allows to control the temperature of a bearing whereby reliability and lifetime of the bearing is increased.

At least one cooling reservoir may be attached to the inner ring of the bearing and the temperature may be measured at least one point of the inner ring of the bearing. In numerous designs the inner ring is the hottest part of the bearing; therefore this part may be measured and cooled directly.

A clearance between the inner ring and the outer ring of the bearing may be controlled for example in a range of −0.1 to 0 2 mm in order to control and maintain the lifetime and the air-gap of the generator.

A clearance between the inner ring and the outer ring of the bearing may be set less than or equal to zero. For example during transportation of the bearing or a wind turbine with the bearing arrangement the temperature of the outer ring and/or the inner ring of the bearing may be controlled in such a way that the clearance between the outer ring and the inner ring is 0.0 mm or even less than 0.0 mm, such as −0.1 mm or less. In another embodiment the clearance between the outer ring and the inner ring is between −0.15 and −0.6 mm. In this way the bearing is locked during transportation and vibrations that may damage the bearing are prevented.

BRIEF DESCRIPTION OF THE DRAWINGS

The accompanying drawings are included to provide a further understanding of embodiments. Other embodiments will be readily appreciated as they become better understood by reference to the following detailed description. The elements of the drawings do not necessarily scale to each other. Like reference numbers designate corresponding similar parts.

DETAILED DESCRIPTION OF INVENTION

Figure 1:
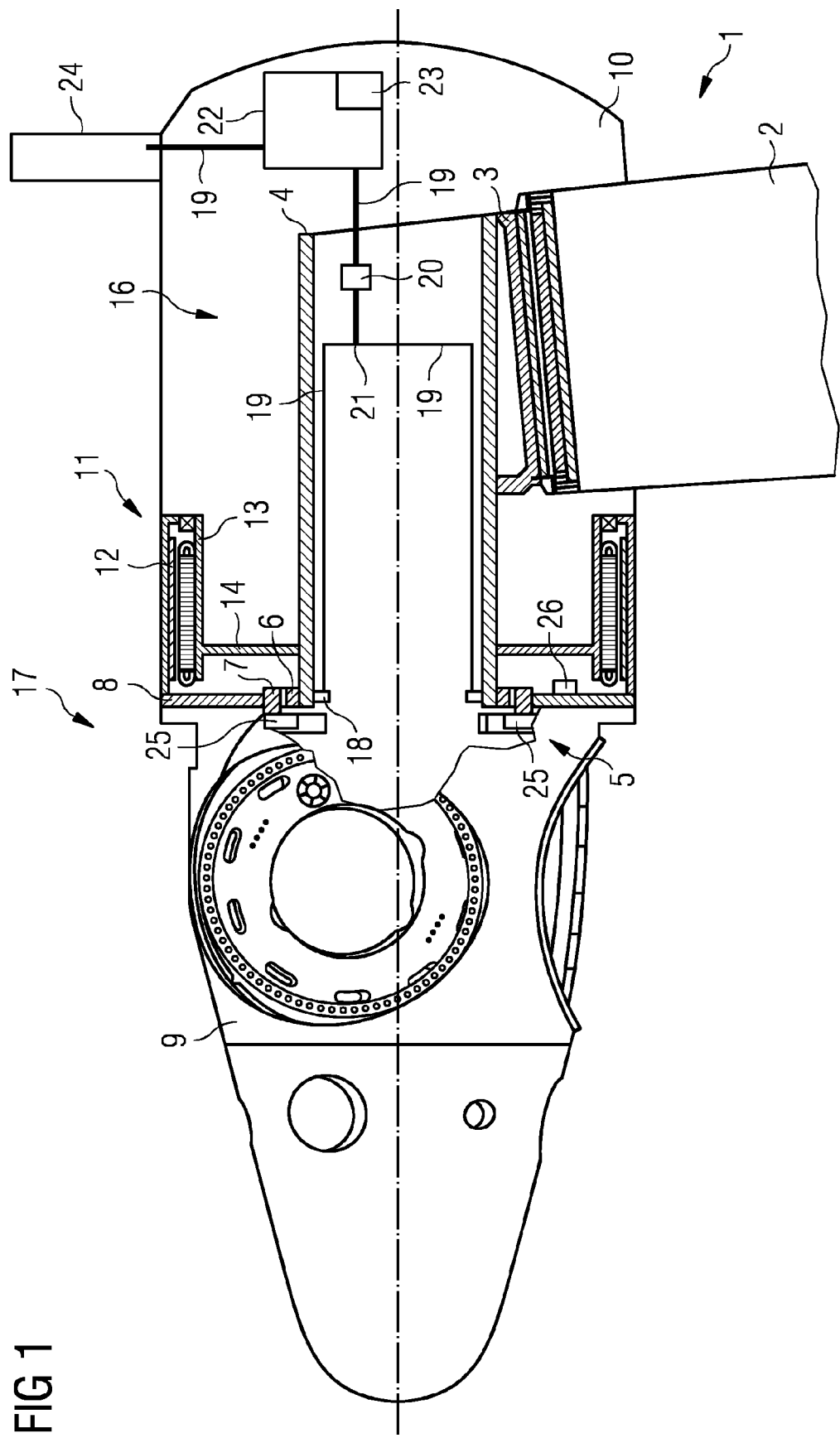
FIG. 1 illustrates a schematic view of a central portion of a wind turbine including a bearing and a thermal control system.

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments may be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

A wind turbine 1 has a tower 2 which is fixed to the ground and carries the whole structure of the wind turbine 1. At the top of the tower 2 a tower connector 3 is attached. The tower connector 3 carries a main shaft 4 of the wind turbine 1. To one end of the main shaft 4 opposite to the tower connector 3 a bearing 5 often called main bearing is fixed. The bearing 5 has an inner ring 6 which is fixed to the main shaft 4 and an outer ring 7. The outer ring 7 is connected to a rotor yoke 8. The rotor yoke 8 is connected with a blade hub 9 which carries the blades of the wind turbine 1. The blades are not illustrated for the sake of clarity. A nacelle 10 surrounds the main shaft 4 and is attached at the main shaft 4.

The wind turbine 1 is a direct drive wind turbine, i.e. the generator 11 is coupled directly to the main shaft 4 and the rotor yoke 8, respectively. No transmission is utilized. The generator 11 comprises an outer rotor 12 attached to the rotor yoke 8 and an inner stator 13 which is fixed to the main shaft 4 via a holding structure 14.

The rotor yoke 8 to which the outer ring 7 is attached is in contact with the ambient air. Therefore, cooling of the outer ring 7 occurs by the ambient air. The inner ring 6 however is located inside the structure of the wind turbine 1 so that no cooling is achieved by ambient air. This leads to a difference in temperature between the inner and outer ring 6 and 7, respectively.

The inner ring 6 of the bearing 5 together with the main shaft 4 has a smaller mass compared to the outer ring 7, the rotor yoke 8 and the blade hub 9. Therefore, inner ring 6 tends to heat up quicker then the outer ring 7.

Furthermore, the inner ring 6 is normally electrical insulated from the main shaft 4 in order to prevent an electrical pathway from the rotor 12 to the stator 13 assembly, but the electrical insulation reduces the thermal conductivity between the inner ring 6 and the main shaft 4 causing an even further heating of the inner ring 6.

The wind turbine 1 is equipped with a thermal control system 15 with a cooling system 16 and a heating system 17.

The cooling system 16 carries heat away from the bearing 5, especially from the inner ring 6. The cooling system 16 has one or more heat sinks or cooling reservoirs 18 which are attached to an inner circumferential surface of the inner ring 6. Here, multiple cooling reservoirs 18 are attached to the inner ring 6. Details of the arrangement of the cooling reservoirs 18 will be discussed in conjunction with FIGS. 2 and 3.

Each cooling reservoir 18 is connected with a conduct 19 in order to circulate a cooling medium like water through the cooling reservoirs 18. The cooling medium transports the heat away from the inner ring 6. The conducts 19 are shown schematically. The actual course of the conducts 19 may differ from the course shown, for example to avoid obstacles or sharp bends. Also, a closed loop for the cooling medium may be used. For ease of understanding FIG. 1 shows one conduct 19 per cooling reservoir 18.

A valve 20 controls the flow of the cooling medium through the conducts 19. The valve 20 may be located before a crosspoint 21 so that the single valve 20 controls the flow of the cooling medium through all conducts 19. The wording before means in this context in the direction of flow of the cooling medium towards the cooling reservoirs 18. Alternatively, one valve may be employed in each conduct to control each cooling reservoir 18 individually. Further, a combination of both is possible. Then each valve may control a group of cooling reservoirs 18.

Further in front of the valve 21 a central device 22 of the cooling system 16 is located. The central device 22 comprises for example a pump for the cooling medium and a control unit 23. Connected to the central device 22 is a heat dissipater or radiator 24. The heat dissipater 24 is arranged outside the nacelle 10 to use ambient air for cooling down the cooling medium. The heat dissipater 24 may be arranged on top of the nacelle 10 for optimal heat transfer. The valve 20 is connected with the central device 22 via a further part of the conduct 19. The central device 22 is connected with the heat dissipater 24 via another part of the conduct 19.

The cooling medium circulates from the heat dissipater 24 through the central device 22 and further through valve 20 which controls the flow of the cooling medium. At the crosspoint 21 the conduct 19 branches out and the cooling medium flows to the cooling reservoirs 18. While flowing through the cooling reservoirs 18 the cooling medium absorbs heat from the inner ring 6. The cooling medium flows back to the heat dissipater 24 where it is cooled down. The conduct or conducts for transporting the cooling medium back to the heat dissipater 24 are not shown for the sake of clarity.

Part of the cooling system 16 like the central device 22 and the heat dissipater 24 may be used for cooling other devices like the generator 11. If the cooling system 16 is retro-fitted into a wind turbine already existing parts like the central device 22 and the heat dissipater 24 may be used for the cooling of the bearing 5 as well.

The heating system 17 includes one or more heating elements 25 which are in thermal communication with the outer ring 7 of the bearing 5. The heating element 25 is here directly attached to the outer ring 7. It is also possible to attach one or more or all of the heating elements 25 to the rotor yoke 8 and/or the blade hub 9. Details of the heating system 17 are described later in conjunction with FIG. 4.

One or more temperature measurement devices or temperature sensors 26 may be employed. The temperature sensor 26 may be arranged at the inner ring 6 for temperature measurement. The results of the measurement are forwarded to the central device 22 or the control unit 23 which controls the valve 20. The control may be based upon the temperature measurement. In a smaller loop of control the temperature sensor 26 controls the valve 20 directly. A combination of several temperature sensors 26 in conjunction with several valves 20 and cooling reservoirs 18 allows for a finer temperature control. In this case the inner ring 6 and/or the outer ring 7 may be divided in several zones of control. To each zone one or more cooling reservoirs 18, a conduct or part of the conduct 19 and a valve 20 and/or one or more heating elements 25 are assigned.

For the sake of clarity the connections between the temperature sensor 26 and the central device 22, the control unit 23 and/or the valve 20 are not shown.

This embodiment employs cooling reservoirs 18 and conducts 19 using a cooling medium like water. It is also possible to use an in a way local heat sink and dissipater. The wording local encompasses a heat sink and dissipater arranged close or directly at the bearing 5 or the inner ring 6. Embodiments for this concept are for example heat sinks with fins or peltier elements. The heat transfer may be supported by an air convection system which streams ambient air along the local heat sink and dissipater.

Figure 2:
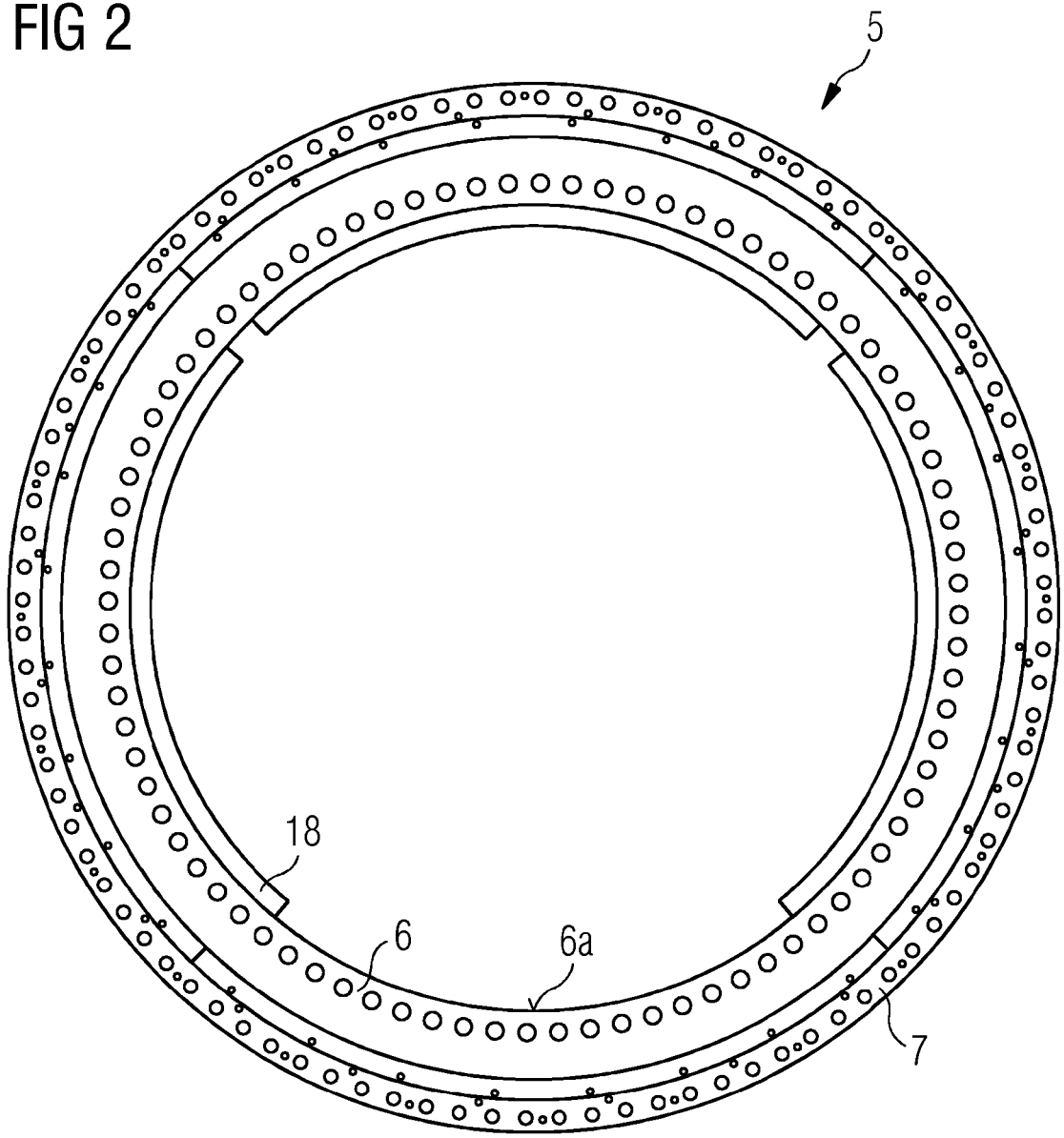
FIG. 2 illustrates a front view of a bearing with a cooling system.

FIG. 2 shows the bearing 5 with inner ring 6 and outer ring 7. Each ring 6, 7 have a flange for mounting the bearing 5 at the main shaft 4 and the rotor yoke 8, respectively.

Along an inner circumferential surface 6a of the inner ring 6 three cooling reservoirs 18 are arranged. The bent shape of the cooling reservoirs 18 is adapted to fit onto the inner circumferential surface 6a. For improved thermal contact between the cooling reservoirs 16 and the inner ring 6 thermal interface material like a sheet of aluminium or a heat conducting paste may be employed. The cooling reservoirs 18 may be evenly distributed along the circumference or may be spaced unevenly as shown to account for restrictions in space for example. It is also possible to attach one or more heat sinks or cooling reservoirs at a face side of the inner ring 6. Care has to be taken that the heat sink stays free from the mounting devices e.g. bolts which connect the inner ring 6 to the main shaft 4.

Each cooling reservoir 18 has a hollow interior space through which a cooling medium like water or a gas may circulate. For entry and exit of the cooling medium the cooling reservoir 18 is equipped with at least one port (not shown). Two ports may be used wherein the ports may be arranged at both ends of the cooling reservoir 18 so that the cooling medium streams through the whole cooling reservoir 18. This ensures a good heat transfer from the inner ring 6 via the cooling reservoir 18 to the cooling medium.

Each cooling reservoir 18 may be connected with its own conduct to the heat dissipater 24 or to a crosspoint. This is a parallel set-up. Alternatively a serial set-up is possible in which an exit port of one cooling reservoir 18 is connected to an entry port of a subsequent cooling reservoir 18. One large cooling reservoir which covers the complete inner surface 6a or most of it may be utilized as well.

The heat sink or cooling reservoir 18 may be integrated into the structure of the inner ring 6. Inner boreholes or channels may be utilized to stream a cooling medium through the inner ring 6. One or more ports for circulation of the cooling medium are then arranged directly at the inner ring 6. A combination of integrally formed heat sinks and external heat sinks is possible as well. For example, grooves may be formed integrally in the surface of the inner ring 6 which communicate with one or more external heat sinks to form a cooling reservoir.

Figure 3:
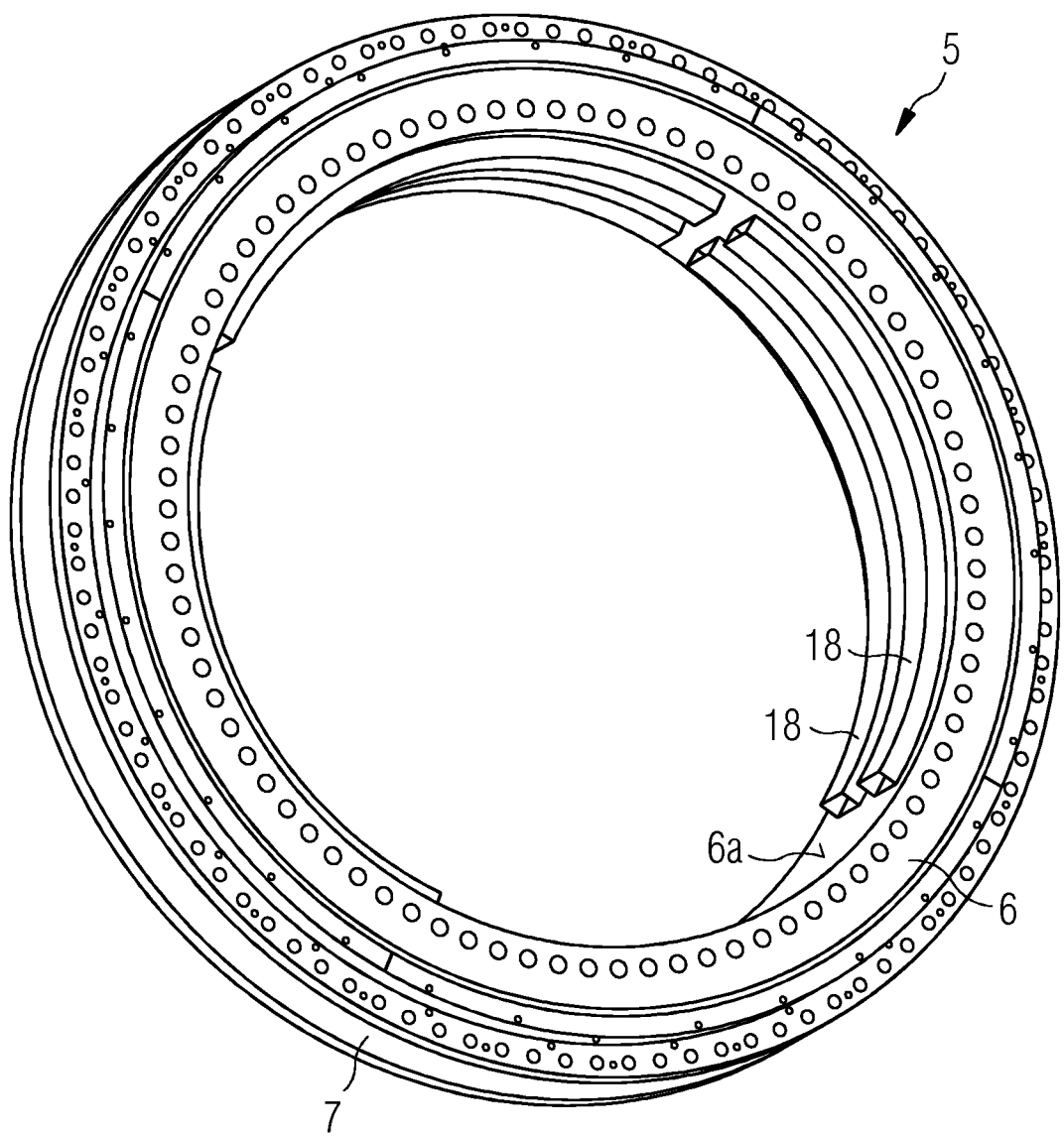
FIG. 3 illustrates a perspective view of a bearing with a cooling system.

FIG. 3 shows a bearing 5 with inner 6 and outer ring 7. At the inner circumferential surface 6a of the inner ring 6 heat sinks or cooling reservoirs 18 are arranged. Here, six cooling reservoirs 18 are attached to the inner ring 6. Along the circumference of the inner ring 6 three pairs of two parallel cooling reservoirs 18 are arranged. This arrangement permits a good heat transfer between the inner ring 6 and the cooling medium inside the cooling reservoirs 18. The detailed discussion of FIG. 2 applies also for the bearing 5 shown in FIG. 3.

Figure 4:
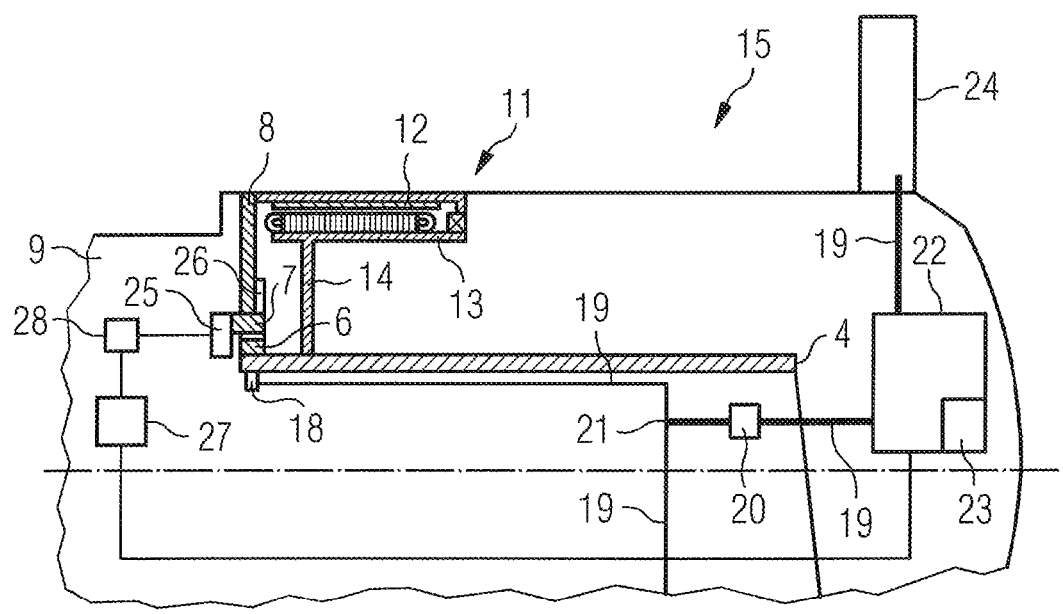
FIG. 4 illustrates a schematic view of a central portion of a wind turbine including a heating system.

FIG. 4 shows the thermal control system 15 of a wind turbine of FIG. 1 in greater detail. Especially the heating system 17 is shown and described.

A heating control unit 27 is in communication with the central device 22 or the control unit 23. The heating control unit 27 is connected to a power unit 28 which is further connected to the one or more electrical heating elements 25 which are attached to the hub 9 at the outer ring 7 of the bearing 5. The heating control unit 27 may also be part of the central device 22 or the control unit 23.

The heating elements 25 may be divided into segments. A ring shaped heating element 25 may be attached directly to the outer ring 7 between the hub 9 and the outer ring 7. The power unit 28 is supplied with power from the wind turbine, a battery and/or external power units. The power unit 28 is controlled by the heating control unit 27.

Temperature measurement devices 26 at the inner ring 6 and/or outer ring 7 may also be connected to the control unit 25. The wiring is not shown for the sake of clarity.

According to a method for controlling the temperature of a bearing 5 the temperature is measured at the bearing 5. The temperature may be measured directly at the inner ring 6 as this will be in most cases the hottest part of the bearing 5. Commonly known devices for the measurement of the temperature may be employed like the temperature sensor 26.

On the basis of the measurement the flow of a cooling medium through the one or more cooling reservoirs 18 is controlled. If, for example the measured temperature reaches an upper threshold the flow of the cooling medium may be increased or the temperature of the cooling medium may be reduced. This leads to higher heat removal. If, for example the measured temperature reaches a lower threshold the flow of the cooling medium may be decreased or the temperature of the cooling medium may be raised. This leads to a lower heat removal. This scheme holds the temperature of the bearing 5 or the inner ring 6 in a defined target corridor. The target corridor may be adapted to models of wind turbines using for example a default setting. The target corridor may also be adapted in real-time for example depending on the wind speed or the ambient temperature. Instead of a target corridor a target point of a certain temperature may be used.

The flow of the cooling medium may be controlled by one or more valves 20 which are located in the conducts 19 reaching to the cooling reservoirs 18. The valves 20 may be controlled by the temperature measurement devices 26 directly or by the central device 22 or the control unit 23 of the thermal control system 15.

Further, the temperature of the one or more heating elements 25 in thermal communication with the outer ring 7 of the bearing 5 is controlled. This control is achieved by the central device 22/control unit 23 and/or the heating control unit 27 which operates a power unit 28 like for example a water heater, a valve, an electrical power source or the like. The power unit 28 directly steers one or more heating elements 25.

The combination of cooling the inner ring 6 and heating the outer ring 7 allows for a good control of the bearing clearance or air-gap.

The control unit 23 may activate the cooling system 16 and the heating system 17 simultaneously or in single operation. This decision may for example depend on the ambient temperature, the overall temperature of the bearing 5, the temperature difference between inner and outer ring or the like.

In case of transportation of the bearing 5 or the wind turbine 1 the clearance between the inner ring 6 and the outer ring 7 of the bearing 5 may be set less than or equal to zero. In particular, the cooling/heating system may be controlled in such a way that the bearing is heavily pre-tensioned during transportation to avoid false brinelling of the bearing and thereby minimizing oscillating motion with a small amplitude. False brinelling is the occurrence of hollow spots that resemble brinell dents and are due to wear caused by vibration and swaying at the contact points between the rolling elements and raceway. The false brinelling of a bearing may occur during transportation if the bearing is not pre-tensioned so much that vibration between the inner and the outer ring of the bearing is avoided. During transportation the cooling medium may be circulated through a heater whereby the cooling system functions as a heating system to ensure a heavily pre-tensioning of the bearing where the clearance between the inner ring and outer ring of the bearing is less than 0.0 mm such as particular −0.1 mm It is possible for the clearance to be even less such as between −0.15 and −0.6 mm

The invention claimed is:

1. A direct drive wind turbine, comprising:
   a generator, comprising:
      a rotor,
      a stator, and
      a bearing with an inner ring and an outer ring rotatively connecting the rotor and the stator, the inner ring being closer to an axis of rotation than the outer ring, the outer ring connected to the rotor; and
   a thermal control system comprising:
      a cooling system comprising:
         a heat sink in thermal communication with the inner ring of the bearing, and
         a heat dissipater in thermal communication with the heat sink, and a heating system comprising a heating element in thermal communication with the outer ring of the bearing, the heating element is arranged at least at one position selected from the group consisting of the outer ring, a rotor yoke and a blade hub, wherein the thermal control system is configured to activate both the cooling system and the heating system in order to simultaneously cause the cooling system to cool the inner ring and the heating system to heat the outer ring, wherein the heating along with the cooling reduces the temperature difference between the inner and the outer rings, and wherein the thermal control system is configured to control the cooling system to cause the cooling system to heat the inner ring sufficiently to reduce a clearance between the inner ring and outer ring to zero and thereby lock the bearing in order to minimize vibration between the inner ring and outer ring during transportation of the bearing.

2. The direct drive wind turbine according to claim 1, wherein the heat sink includes a cooling reservoir for a cooling medium.

3. The direct drive wind turbine according to claim 1, wherein the heat sink is arranged at the inner circumferential surface of the inner ring.

4. The direct drive wind turbine according to claim 1, wherein the heat sink is formed integrally with the inner ring.

5. The direct drive wind turbine according to claim 1, wherein the heating element includes electrical heating means and/or hot fluid heating means.

6. The direct drive wind turbine according to claim 1, wherein the heating element is formed integrally with the outer ring.

7. The direct drive wind turbine according to claim 1, wherein the thermal control system includes a control device in communication with the cooling system and/or the heating system for controlling the temperature of the bearing.

8. The direct drive wind turbine according to claim 1, wherein the thermal control system includes a temperature measurement device.

9. The direct drive wind turbine according to claim 3, wherein the heat sink is attached to the inner circumferential surface of the inner ring.

10. The direct drive wind turbine according to claim 1, wherein the heat element is attached to the outer ring.

11. The direct drive wind turbine according to claim 1, wherein the inner ring is connected to a stationary part.

12. The direct drive wind turbine according to claim 1, comprising a nacelle, wherein the heat dissipater is arranged outside the nacelle.

13. The direct drive wind turbine according to claim 1, wherein the heat dissipater is exposed to ambient air.

14. The direct drive wind turbine according to claim 1, comprising a hub, wherein the heating element is attached to the outer ring and arranged between the hub and the outer ring.

\* \* \* \* \*